United States Patent [19]

Varano et al.

[11] Patent Number: 5,660,326

[45] Date of Patent: Aug. 26, 1997

[54] MULTI-LAYERED INSULATED CUP FORMED FROM FOLDED SHEET

[75] Inventors: Richard Varano, Avon, Conn.; Claus E. Sadlier, San Francisco, Calif.

[73] Assignees: Sherwood Tool Incorporated, Kensington, Conn.; by said R. Varano; Insul-Air Holding, Inc., San Francisco, Calif.; by said C. E. Sadlier

[21] Appl. No.: 641,213

[22] Filed: Apr. 30, 1996

Related U.S. Application Data

[63] Continuation-in-part of Ser. No. 516,913, Aug. 18, 1995, abandoned.

[51] Int. Cl.⁶ .................................................. B65D 3/22
[52] U.S. Cl. ........................ 229/403; 220/441; 220/739; 229/4.5; 493/152; 493/907
[58] Field of Search .................................. 220/441, 443, 220/737–739; 229/4.5, 5.5, 400, 403; 493/93, 152, 154–159, 903, 906, 907, 908

[56] References Cited

U.S. PATENT DOCUMENTS

| | | |
|---|---|---|
| 154,498 | 8/1874 | Long . |
| 411,096 | 9/1889 | Eaton et al. . |
| 1,091,526 | 3/1914 | Moore . |
| 1,098,178 | 5/1914 | Semple . |
| 1,158,581 | 11/1915 | Swift . |
| 1,208,483 | 12/1916 | Chesbrough . |
| 1,284,728 | 11/1918 | Luellen . |
| 1,297,152 | 3/1919 | Hackney . |
| 1,334,302 | 3/1920 | Hicks . |
| 1,665,033 | 4/1928 | Jensen . |
| 1,771,765 | 7/1930 | Benson . |
| 1,850,013 | 3/1932 | Hinkley . |
| 2,051,076 | 8/1936 | Deakin .......................... 154/28 |
| 2,155,487 | 4/1939 | Hatch ............................ 229/5.5 |
| 2,266,828 | 12/1941 | Sykes . |
| 2,444,861 | 7/1948 | Symmes . |
| 2,457,198 | 12/1948 | Bell ............................... 229/4.5 |
| 2,512,602 | 6/1950 | Bell ............................... 229/5.5 |
| 2,563,352 | 8/1951 | Morse . |
| 2,591,578 | 4/1952 | McNealy . |
| 2,661,889 | 12/1953 | Phinney . |
| 2,828,903 | 4/1958 | Adkins . |
| 2,917,215 | 12/1959 | Psaty et al. . |
| 2,954,913 | 10/1960 | Rossman . |
| 3,001,683 | 9/1961 | Goodwin et al. . |
| 3,079,027 | 2/1963 | Edwards . |
| 3,194,468 | 7/1965 | Baron . |
| 3,383,025 | 5/1968 | Ferrey et al. . |

(List continued on next page.)

FOREIGN PATENT DOCUMENTS

| | | |
|---|---|---|
| 0371918 | 6/1990 | European Pat. Off. . |
| 1167861 | 10/1969 | United Kingdom . |
| 1366310 | 9/1974 | United Kingdom . |

*Primary Examiner*—Gary E. Elkins
*Attorney, Agent, or Firm*—David Pressman

[57] ABSTRACT

An elongated sheet (10) is used to form a thermally insulated cup (30). The sheet includes a pair of spaced apart smooth portions (12, 13) connected by a middle portion (11). The smooth portions are folded on opposite sides of the middle portion. The middle portion is corrugated or otherwise distorted to create air space. The folded sheet is wound around a mandrel to form a cylinder. The ends of the smooth portions are joined together, and a bottom closure (14) is attached to form the cup. The finished cup includes a smooth outer shell (12S), a smooth inner shell (13S), and a middle layer (11L) sandwiched therebetween. The middle layer forms many air spaces between the shells to thermally insulate the contents of the cup, and also provide structural strength. The cup can be constructed of paper, which makes it biodegradable and recyclable, and its simple construction method makes it easy and inexpensive to manufacture using standard, conventional machinery. In an alternative embodiment (FIG. 5A), the starting blank may have the insulating portion (34) at one end instead of the middle, and it is suitably folded so that the insulating layer comes out as a middle layer (FIG. 6A). In another embodiment, the starting blank has just two sections (FIG. 7A) and it is similarly folded and wound so that the cup has two layers, an outer corrugated layer (34) and an inner smooth layer (32).

54 Claims, 6 Drawing Sheets

U.S. PATENT DOCUMENTS

| | | | |
|---|---|---|---|
| 3,410,473 | 11/1968 | Petrie | 229/4.5 |
| 3,443,715 | 5/1969 | Edwards . | |
| 3,456,860 | 7/1969 | Janninck . | |
| 3,503,310 | 3/1970 | Goetz . | |
| 3,908,523 | 9/1975 | Shikaya . | |
| 4,261,501 | 4/1981 | Watkins et al. . | |
| 4,347,934 | 9/1982 | Goodman | 206/633 |
| 4,398,650 | 8/1983 | Holmes et al. | 220/443 |
| 4,836,400 | 6/1989 | Chaffey et al. . | |
| 4,993,580 | 2/1991 | Smith | 220/443 |
| 5,092,485 | 3/1992 | Lee | 220/441 |
| 5,102,036 | 4/1992 | Orr et al. | 229/89 |
| 5,145,107 | 9/1992 | Silver et al. . | |
| 5,205,473 | 4/1993 | Coffin . | |
| 5,226,585 | 7/1993 | Varano . | |
| 5,256,131 | 10/1993 | Owens et al. | 493/374 |
| 5,259,529 | 11/1993 | Coale | 220/739 |
| 5,326,019 | 7/1994 | Wolff . | |
| 5,363,982 | 11/1994 | Sadlier | 220/441 |
| 5,415,339 | 5/1995 | Howard | 229/403 |
| 5,454,484 | 10/1995 | Chelossi | 220/738 |
| 5,460,323 | 10/1995 | Titus | 229/403 |

MULTI-LAYERED INSULATED CUP FORMED FROM FOLDED SHEET

BACKGROUND—CROSS-REFERENCE TO RELATED CASES

This invention is an improvement upon that of U.S. Pat. No. 5,363,982 to joint inventor C. E. Sadlier, granted Nov. 15, 1994, and is a continuation-in-part of application Ser. No. 08/516,913, filed 1995 Aug. 18, now abandoned.

BACKGROUND—FIELD OF INVENTION

This invention relates generally to disposable containers, specifically to an insulated cup made of sheet material.

BACKGROUND—PRIOR ART

There are three main types of disposable cups: polystyrene, expanded resin, and paper.

Polystyrene cups are aesthetically pleasing, but they can be used only for holding cold drinks, and are not biodegradable or easily recyclable.

Cups of expanded synthetic resin material, sold under the trademark Styrofoam, are excellent thermal insulators, so that they can maintain the temperature of a drink, whether hot or cold, for long periods of time. They are comfortable to handle because their exteriors stay close to ambient temperature, regardless of the temperature of the drink. However they are environmentally unfriendly because they are not biodegradable or easily recyclable. As a result, they are being banned from many municipalities.

Standard single-layer paper cups are recyclable and biodegradable and therefore more environmentally sound. However they are poor thermal insulators, so that a beverage in a paper cup quickly warms (if cold) or cools (if hot). They are also uncomfortable to handle because a hot or cold drink can burn or uncomfortably cool a hand. Also a cold drink will cause condensation to appear on the outside, making a paper cup slippery and difficult to hold. Their single-layer construction makes them fragile, so that large cups filled with liquid easily crumble after prolonged handling.

Multi-layered paper cups have been designed for providing thermal insulation and increased strength. U.S. Pat. Nos. 2,661,889 to Phinney (1948), 4,993,580 to Smith (1991), 5,092,485 to Lee (1992), and 5,205,473 to Coffin (1993) show three-layered cups with smooth outer and inner shells, and a corrugated middle layer. The corrugated layer provides air pockets or spaces for thermal insulation and added strength to withstand prolonged handling.

Although strong and thermally efficient, these cups are all expensive and impractical to manufacture because their three layers are formed separately and then assembled together. This requires at least three adhesive joints for the forming the layers into tapered cylinders, two adhesive joints for assembling the layers together, and an adhesive joint for attaching the bottom. Some cups require even more adhesive joints. The liberal use of glue renders the cups difficult or impossible to recycle. The layers are usually formed from blanks cut separately from sheets, so that they do not make the most efficient use of paper and machinery time. Furthermore, the extra steps slow the production process, prevent the cups from being made on standard, existing cup-forming machinery, and increase manufacturing overhead and direct labor allocation, so that the prior-art cups are too expensive. As a result, these cups have never achieved commercial success.

Although similar in its multilayered design, conventional corrugated boxboard also has never achieved commercial success for use in forming cylindrical drinking cups because its layers are permanently fixedly adhered to one another. This makes it physically impracticable to bend or wrap boxboard into a smooth cylindrical shape.

Often establishments selling very hot or cold beverages in paper cups will use double or nested cups to avoid the above problems of single paper cups, but doubling cups is time consuming and expensive.

The above Sadlier patent discloses a three-layered cup having smooth outer and inner layers and a corrugated middle layer, all formed of one continuous sheet wound in a spiral. Although more economical to manufacture than prior-art cups, this cup preferably employs a unidirectional winding of three layers on a spinning mandrel, and therefore cannot be readily manufactured by existing mass production cup-forming machinery, which typically wraps a cup's side wall blank vertically into a cylindrical shape, around a non-spinning mandrel.

OBJECTS AND ADVANTAGES

Accordingly, several objects and advantages of the invention are to provide a cup which is thermally insulating for comfortable handling and for maintaining the temperature of its contents, which is sturdy enough to withstand prolonged handling, which can be made of biodegradable and recyclable materials, which is easy and inexpensive to manufacture, and which can be made by existing machinery.

Other objects are to provide an insulated cup which is simpler in construction, which is more economical to fabricate, which can be fabricated in a variety of ways, which does not require unidirectional winding on a spinning mandrel.

Further objects and advantages will become apparent from a study of the following description and the accompanying drawings.

SUMMARY

In accordance with one embodiment of the present invention, a thermally insulated cup is formed from one continuous, homogeneous sheet of paper having two spaced apart smooth end or outer portions connected by a corrugated middle portion. The smooth end portions are folded over opposite sides of the corrugated portion. The folded sheet is wrapped or bent around a mandrel to form cylindrical inner and outer shells that sandwich the corrugated portion therebetween. The ends of each smooth portion are sealed together. A bottom closure is attached to the inner shell. The resulting three-layered cup is strong, offers good thermal insulation for comfortable handling and for maintaining the temperature of its contents, and can be formed on existing machinery. Alternatively the continuous sheet may be formed of separate sections which are adhered together. Further, the corrugated portion can be an outer, rather than a middle, portion. Moreover the starting sheet can have two portions, so that after folding, it is wrapped into a two layered insulated cup, with the corrugated layer on the outside.

DRAWING FIGURES

DRAWING REFERENCE NUMERALS

| | |
|---|---|
| 10. | Continuous Sheet |
| 11. | Corrugated Portion |
| 11L. | Corrugated Layer |
| 12. | First Smooth Portion |
| 12B. | Bottom Edge |
| 12F. | Free End |
| 12P. | Proximal End |
| 12S. | Outer Shell |
| 12T. | Top Edge |
| 13. | Second Smooth Portion |
| 13B. | Bottom Edge |
| 13F. | Free End |
| 13P. | Proximal End |
| 13S. | Inner Shell |
| 13T. | Top Egde |
| 14. | Bottom Closure |
| 14R. | Bottom Closure Rim |
| 15. | Air Pockets |
| 16. | Water-Proof Coating |
| 17. | Reflective Coating |
| 20. | Continuous Sheet |
| 21. | Corrugated Piece |
| 22. | Smooth Piece |
| 23. | Smooth Piece |
| 24. | Bottom Closure |
| 30. | Cup |
| 31. | Mandrel |
| 32. | Middle Section |
| 34. | Right Section |
| 36. | Fold Line |
| 38. | Flat Sheet |
| 40. | Score |

Figure 1A:
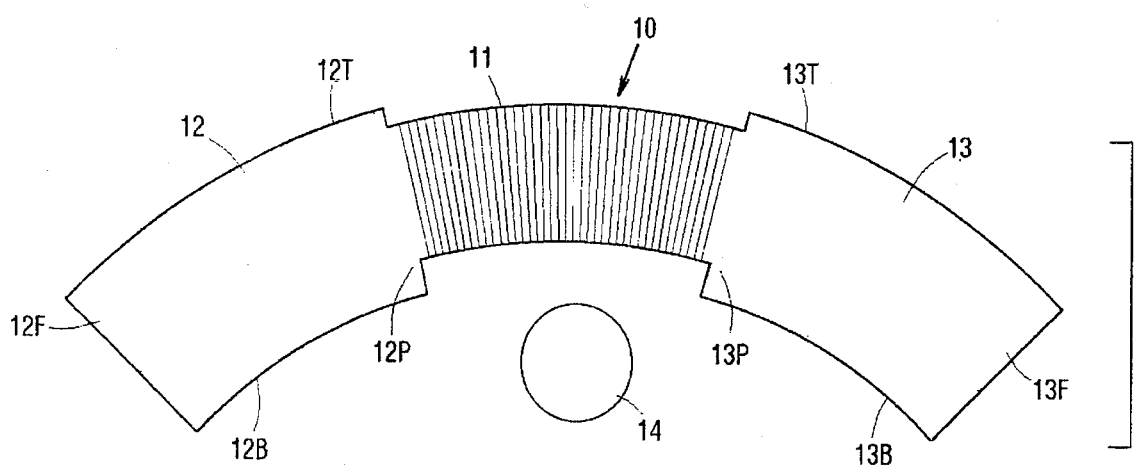
FIG. 1A is a plan view showing the components, in blank sheet form, for making a three-layered insulated cup employing a one-piece side component having a middle corrugated section, in accordance with one embodiment of the invention.
Figure 1B:
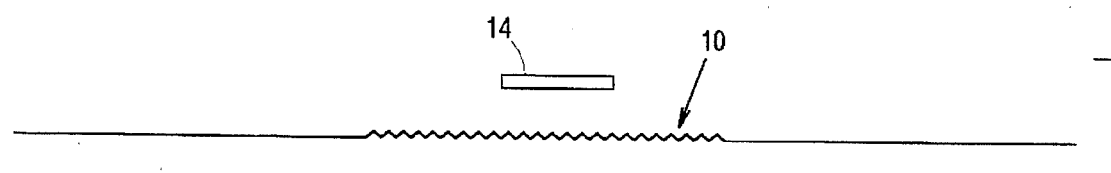
FIG. 1B is an edge view of the blank sheet components of FIG. 1A.
Figure 1C:
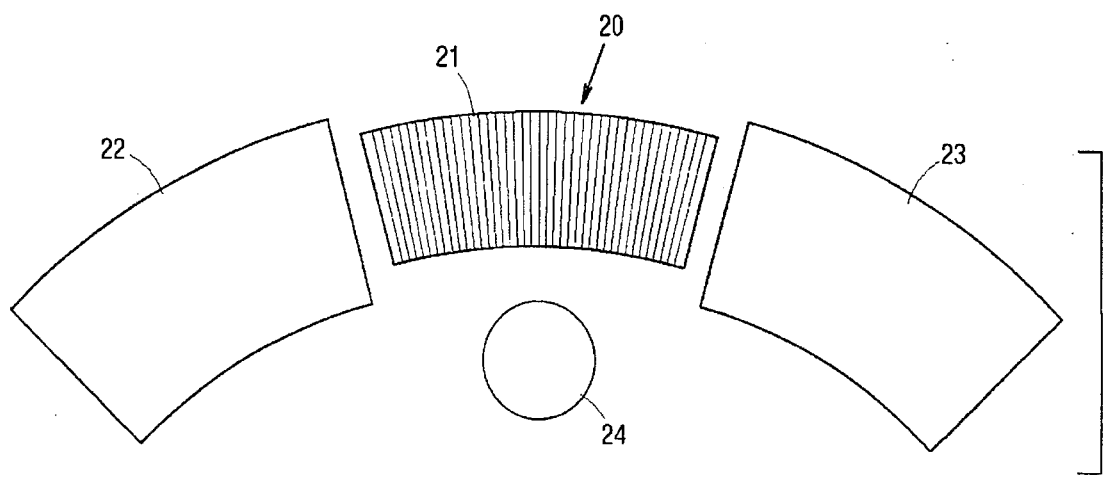
FIG. 1C is a plan side view similar to FIG. 1A, but where the side component is initially in three parts.

FIGS. 1A to 1C—Sheet Blanks

In accordance with a first embodiment of the invention shown in FIG. 1A, a cup or container (FIG. 4) begins as a continuous, homogeneous sheet 10, which is die cut from a larger sheet (not shown) of paper or another suitable sheet material. Sheet 10 includes an arc-shaped corrugated middle portion 11, and two longer, arc-shaped, first and second smooth end or outer portions 12 and 13, respectively, extending from the ends of corrugated portion 11. Smooth portions 12 and 13 have proximal ends 12P and 13P, respectively, free ends 12F and 13F, top edges 12T and 13T, and bottoms edges 12B and 13B. A round, bottom closure 14 is cut separately. The corrugations in portion 11 are clearly shown in the edge view of FIG. 1B. They are formed by methods well known in the art and are shown as having sharp folds, but alternatively can have rounded bends or bight portions.

In accordance with a second embodiment of the invention shown in FIG. 1C, a continuous sheet 20 can be formed by gluing together the appropriate edges of a corrugated piece 21 and separate smooth pieces 22 and 23. Bottom closure 24 is a/so cut separately. Corrugated piece 21 is slightly longer than corrugated portion 11 shown in FIG. 1A, so that its ends slightly overlap smooth pieces 22 and 23 for gluing. Cutting the three pieces separately may allow multiple types of sheet material to be used in fabricating sheet 20. E.g., recycled paper can be used for corrugated piece 21 and a type of paper known as SBS (solid bleach sulfite) can be used for smooth pieces 22 and 23.

In both embodiments (FIGS. 1A and 1B, as well as FIG. 1C), the corrugated middle portion (11 or 21) has a slightly lesser height than the end or outer portions, for a reason to be described.

Figure 2A:
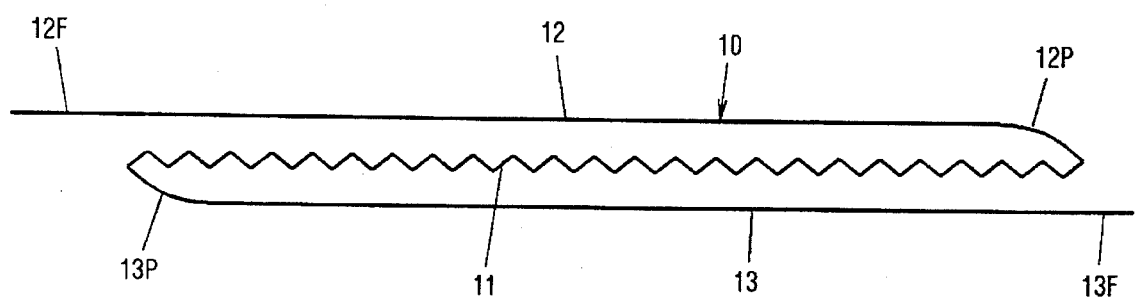
FIG. 2A is an enlarged edge view of the side component of FIG. 1A after folding, a stage in manufacturing.
Figure 2B:
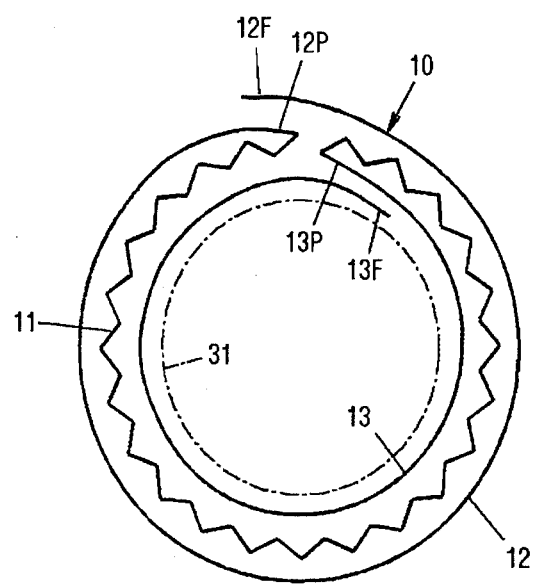
FIG. 2B is a top view of the side component after wrapping into a cylindrical shape, another stage in manufacturing.

FIGS. 2A and 2B—Folding And Wrapping

The cup (FIG. 3) is formed by fast folding smooth portions 12 and 13 on opposite sides of corrugated portion 11, as shown in FIG. 2A. Sheet 10 then consists of a flat three-layered arrangement, with a corrugated layer or portion sandwiched between the smooth outer layers or portions. Smooth portions 12 and 13 are longer than corrugated portion 11, so that their free ends 12F and 13F, respectively, extend beyond the ends of corrugated portion 11. A weak adhesive or tack, such as weak glue, elastic glue, or heated polyethylene may optionally be used to hold the folded, three-layered sheet flat until it is wrapped and sealed (described in the next paragraph). The dimensions of the portions are selected according to the size of the cup being produced.

Sheet 10 is then wrapped around a tapered mandrel 31, as shown in FIG. 2B. The inner smooth layer is then completed by gluing or otherwise joining or sealing the excess portion at free end 13F to proximal end 13P through the application of a cold adhesive, or through the use of heated polyethylene. Similarly the outer smooth layer is then completed in a similar manner by gluing or sealing free end 12F to portion 12.

Figure 3:
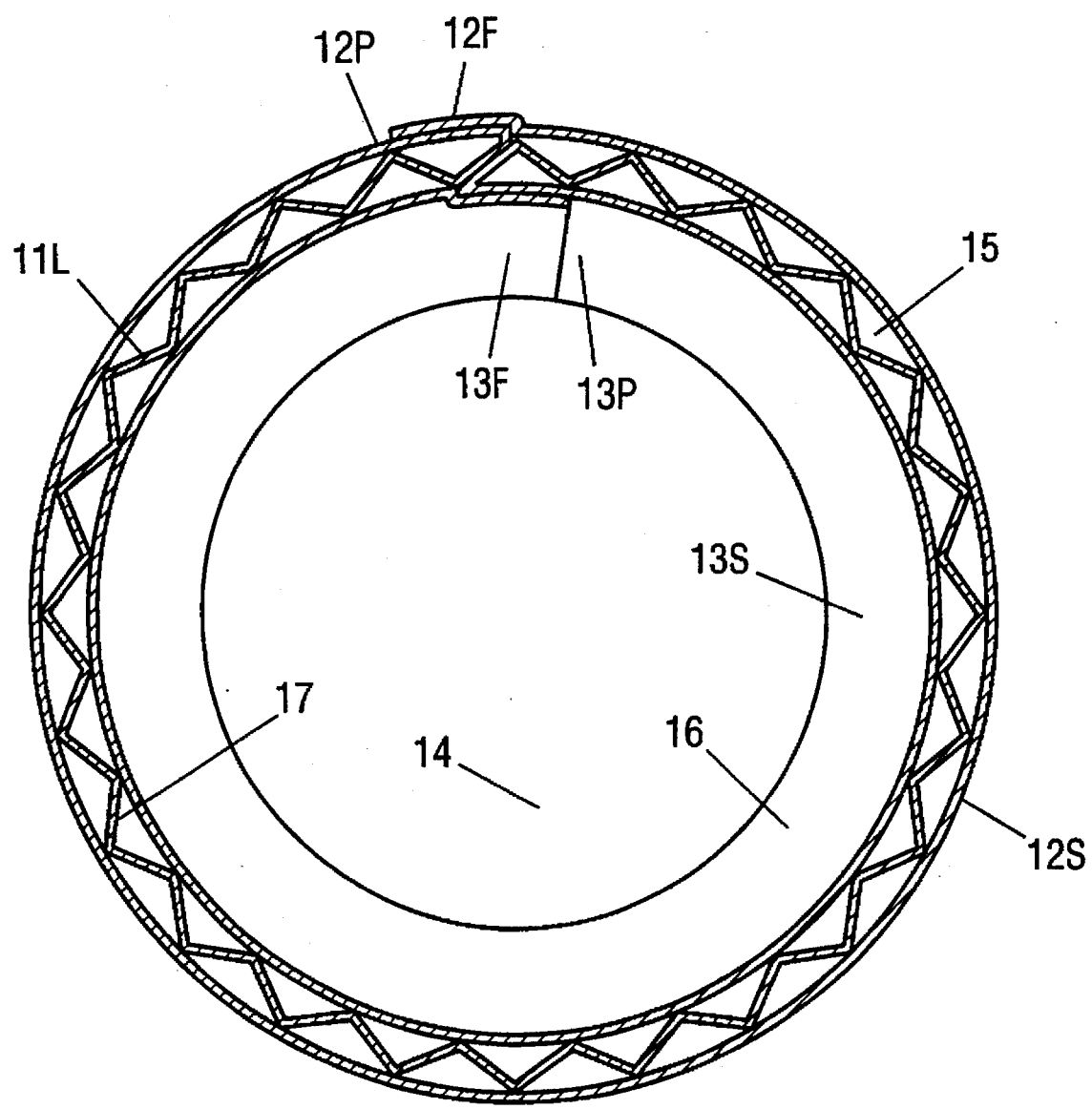
FIG. 3 is an enlarged top sectional view of the finishell cup.
Figure 4:
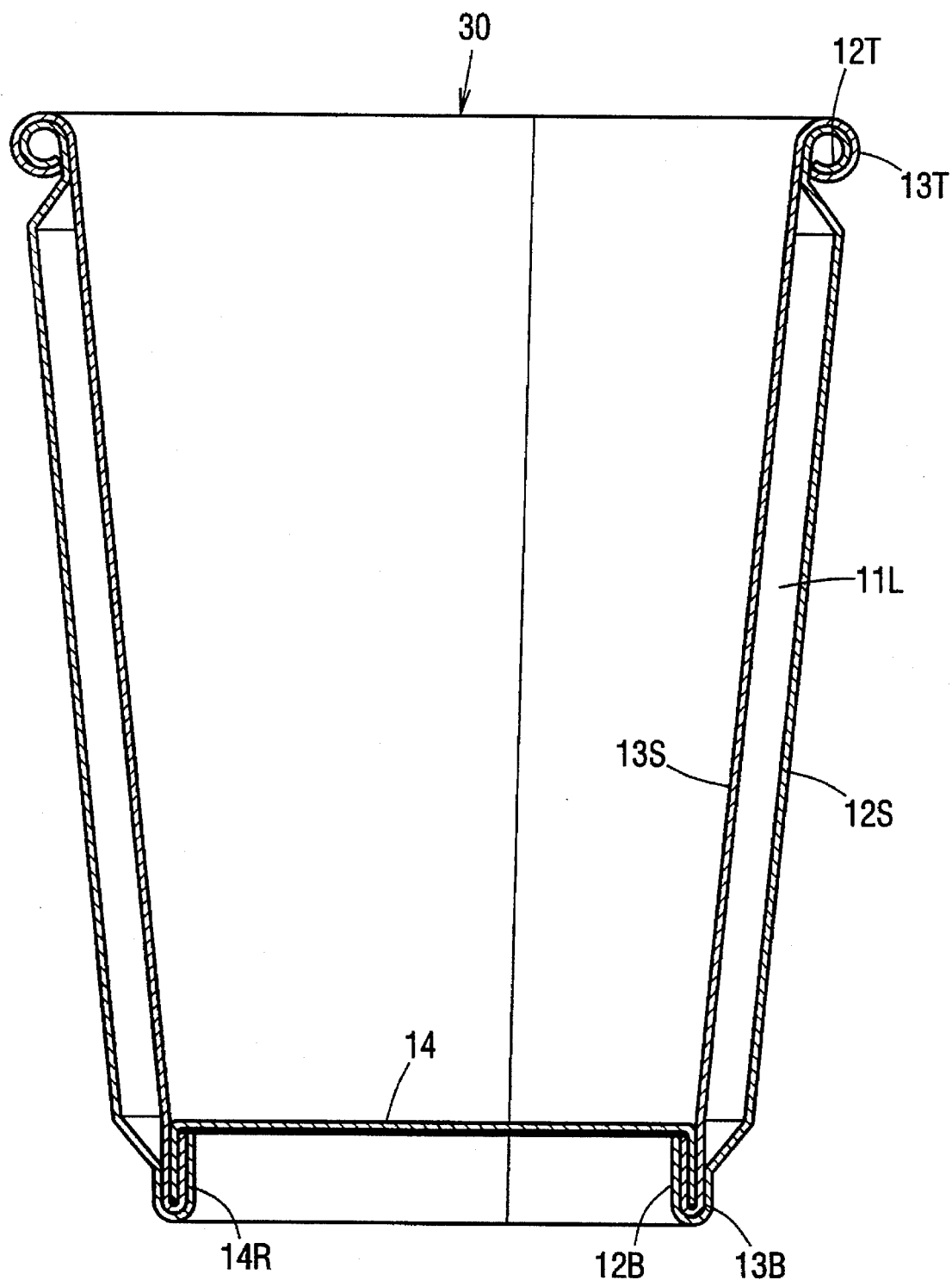
FIG. 4 is an enlarged side sectional view of the finishell cup.

FIGS. 3 and 4—Sectional Views

Tapered cylindrical inner shell 13S and outer shell 12S are thus formed and sealed, as shown in the top sectional view in FIG. 3. Corrugated portion 11 (FIG. 2B) is sandwiched between the shells to form a corrugated middle, insulating layer 11L. A bottom closure 14 is attached within inner shell 13S, as will be explained in conjunction with FIG. 4.

Smooth portion 12 (FIG. 2A) is longer than smooth portion 13 (FIG. 2A), so that after they are formed into cylinders, outer shell 12S is larger in diameter than inner shell 13S for accommodating the thickness of corrugated layer 11L. Although sheet 10 is used in this example, sheet 20 (FIG. 1C) can also be used.

As thus constructed, corrugated layer 11L forms many thermally insulating air spaces 15 between itself and the shells. If the cup is made with polyethylene-coated paperboard, it already has waterproofing material on it. Otherwise, it is coated with a suitable waterproofing material 16, such as plastic or wax. The inside surface of middle layer 11L is optionally coated with a reflective material 17. This will reflect radiant heat back to its source, whether from the cup's contents or from the air outside the cup, so that thermal efficiency is further improved. Because the three layers of the cup are constructed by simply folding and winding sheet 10 (FIG. 1A), it is very easy and economical to manufacture.

As shown in the side sectional view in FIG. 4, cup 30 includes three layers formed from outer shell 12S, corrugated layer 11L, and inner shell 13S. Top edges 12T and 13T are crimped together and rolled outwardly to form a rim. Bottom edges 12B and 13B are folded inwardly, and sealed to the inside of a rim 14R on bottom closure 14 for a watertight seal. Because corrugated portion 11 (FIG. 1A) is narrower than smooth portions 12 and 13 (FIG. 1A), the top and bottom edges of corrugated layer 11L stay clear of the crimped top and bottom of cup 30.

FIGS. 5A To 6B-Corrugated Portion At End

Figure 5A:
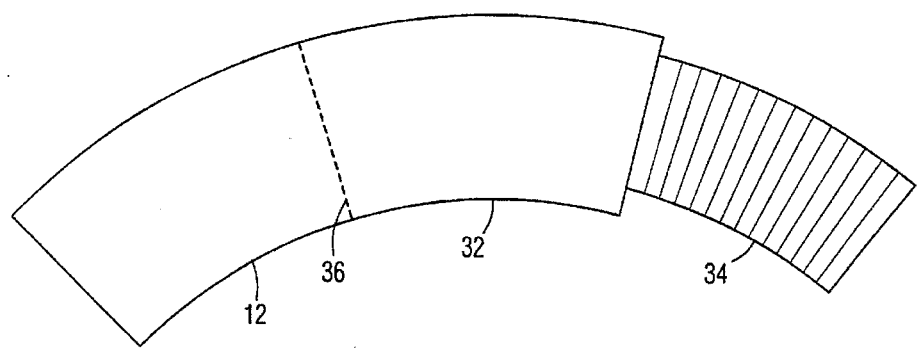
FIG. 5A is a plan view of a blank sheet for making a three-layered insulated cup employing a one-piece side component having an end corrugated section, in accordance with another embodiment of the invention.
Figure 5B:
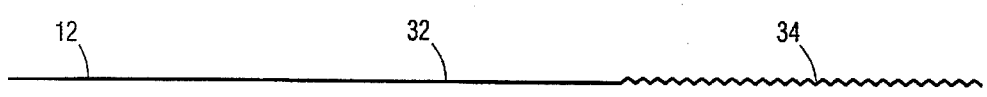
FIG. 5B is an edge view of the blank sheet of FIG. 5A.

In lieu of providing the corrugated portion in the middle of the starting blank, as shown in FIG. 1A, the corrugated portion may be provided at one end of the starting blank, as shown in FIGS. 5A and 5B. Here the starting blank has three sections: a left end section 12 which is identical to that of FIG. 1A, a middle section 32 which is identical to end section 13 of FIG. 1A, but is now adjacent and continuously integral homogeneous with left end section 12, and a corrugated right end section 34 which is identical to corrugated middle section 11 of FIG. 1A, but is now at one end instead of in the middle. As with FIGS. 1A and 1C, the corrugated section of FIG. 5A (and the remaining figures) is tapered, like the smooth sections. The blank is continuous, integral, and homogeneous, with sections 12 and 32 being smooth and distinguishell or separated by a broken fold line 36. Section 34 is corrugated or scored (see discussion of FIG. 9 infra) by a standard die operation (not illustrated). The entire blank preferably is die cut from a larger starting sheet. Except for the above-noted distinguishing features, the blank of FIGS. 5A and 5B is similar to the blank of FIG. 1A.

Figure 5C:
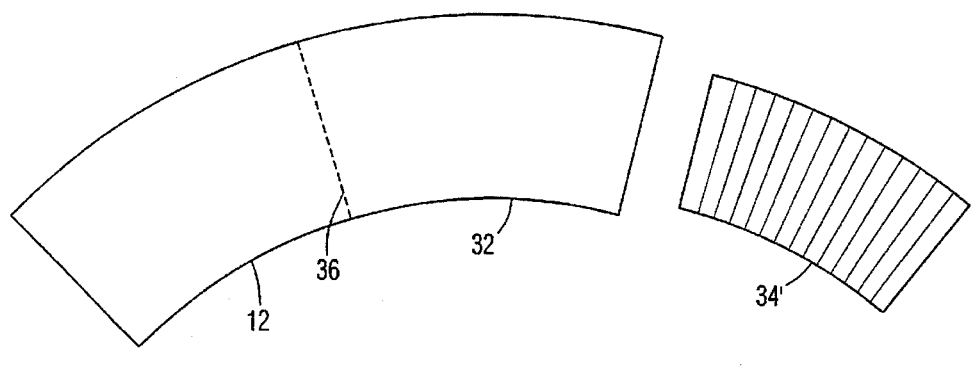
FIG. 5C is a plan side view similar to FIG. 5A, but where the side component is initially in two parts.

While FIG. 5A shows a single continuously integral starting blank, the stating blank may be formed from two separate portions, as shown in FIG. 5C. One portion, consisting of left end section 12 and middle section 32, is smooth and continuously integral or homogeneous, and the other portion, consisting of corrugated portion 34', is separate and is formed separately. Then the two separate portions of FIG. 5C are glued together (operation not illustrated) along the leftmost one of the sections of the corrugated portion to form a blank similar to that of FIG. 5A. As stated supra, cutting the two pieces separately may allow multiple types of sheet material to be used in fabricating sheet 20. E.g., recycled paper can be used for corrugated piece 34 and SBS can be used for smooth pieces 12 and 32.

Figure 6A:
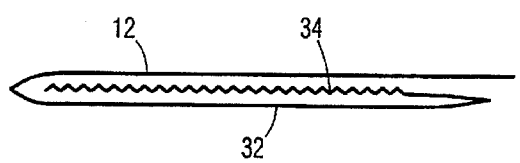
FIG. 6A is an edge view of the side component of FIG. 5A after folding.
Figure 6B:
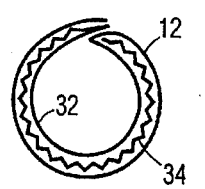
FIG. 6B is a top view of the side component of FIG. 5A after wrapping into a cylindrical shape.

The blank of FIG. 5A (or FIG. 5C after gluing) is then folded a first time so that corrugated section 34 is adjacent and parallel to middle, smooth section 32, and then left end portion 12 is folded over the corrugated portion so that all three sections are parallel and the corrugated portion is sandwiched between the two smooth portions, as shown in FIG. 6A. Then the folded blank is wrapped or bent around a mandrel (not shown) to form a cylinder, as shown in FIG. 6B. The ends of the blank are the sealed together, as with the embodiment of FIG. 4, the bottom (not shown) of the cup is attached in a similar manner, and it is finishell in the same manner as with FIG. 4. A cup made from the cylinder of FIG. 6B has all of the advantages of the cup of FIG. 4. It can be fabricated from a blank (FIG. 5A) in which the corrugated section is at one end, rather than in the middle, thereby providing an alternative starting blank.

FIGS. 7A To 8B—Two-Layered Cup

Cups formed from the container blanks shown in FIGS. 7A to 8B are similar to cups of the previous embodiments, but have sidewalls which include two layers instead of three and are thus are more economical and simpler to fabricate.

Figure 7A:
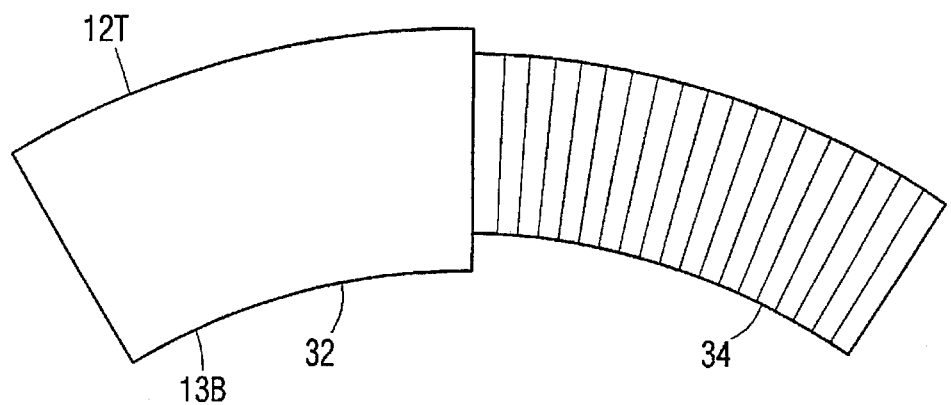
FIG. 7A is a plan view of a blank sheet for making an insulated two-layered cup employing a one-piece side component having an end corrugated section, in accordance with yet another embodiment of the invention.
Figure 7B:
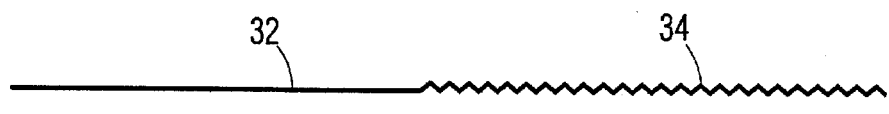
FIG. 7B is an edge view of the sheet blank of FIG. 7A.
Figure 8A:
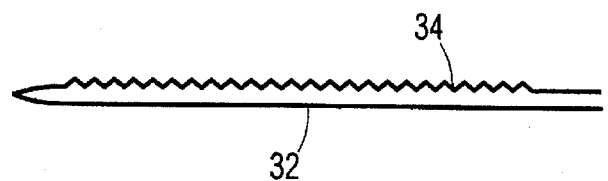
FIG. 8A is an edge view of the side component of FIG. 7A after folding.
Figure 8B:
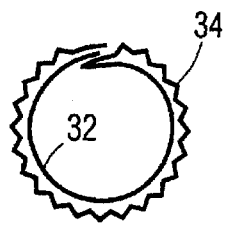
FIG. 8B is a top view of the side component of FIG. 5A after wrapping into a cylindrical shape.

As shown in FIGS. 7A and 8B, the sidewall blank has inner and outer surfaces indicated at 26 and 28, respectively, and includes a substantially flat or smooth left section 32, and a right corrugated section 34, both of which are substantially identical to their respective counterparts shown in FIG. 5A. The two sections may be formed as a homogenous piece as shown in 5A or of two separate pieces (not shown) which are glued together form a unitary strip of deformable sheet material as shown in FIG. 7A.

The top and bottom edges of the blank, indicated at 13T and 12B, respectively, have an arcuate configuration and a common center of curvature, substantially as shown in FIG. 7A.

The illustrated strip (FIGS. 7A and 7B) is folded once along a common fold line at the junction of sections 32 and 34 to bring the two sections into face-to-face engagement with each other to form a multi-layered container sidewall blank having an end portion at the left end of the blank defined by the common fold line and another end portion at the fight end of the sidewall blank formed by the free ends of sections 32 and 34. The integral corrugations formed in section 34 define depressions in the face of this section which cooperate with the associated face of section 32 when the two sections are brought together in face-to-face relation to form a plurality of air spaces between sections or layers 32 and 34 which comprise the two-layered blank shown in FIG. 8A.

The sidewall blank (FIG. 8A) is then wrapped around a mandrel (not shown) to bring the opposite end portions of the blank into overlapping relation to each other. Thus, as shown in FIG. 8B, the free end portions of sections or layers 32 and 34 are brought into overlapping relation with a marginal portion of the opposite or folded end of the blank. The overlapping portions are joined to each other to form a continuous container sidewall, such as generally shown in FIG. 8B. This joining operation forms the side seam of the cup and is performed while the cup sidewall blank is supported on the mandrel, in a manner well known in the cup and container making art.

The shape of the mandrel used to form the container will vary and will be determined by the shape of the container to be formed. The folded sidewall blank formed from the flat strip shown in FIG. 7A is particularly adapted for use in making a tapered cylindrical paper cup having a substantially circular cross section throughout its height. Therefore a tapered cylindrical mandrel will be employed for making such a cup.

In accordance with the presently preferred cup construction, smooth layer 32 forms the inner surface of the cup, whereas corrugated layer 34 defines a portion of the exterior surface of the container.

While the container sidewall blank remains in position on the mandrel, the bottom of the cup is attached to the sidewall by a rolling or crimping operation and a bead is preferably rolled around the upper end of the cup sidewall blank to complete cup assembly.

Figure 9:
FIG. 9 is an edge view of an alternative insulating layer employing spaced grooves.

FIG. 9—Alternative Insulating Layer

In lieu of a corrugated insulating layer, the insulating layer in any embodiment may be made of a flat sheet 38 (FIG. 9) with spaced, grooves or scores 40 formed in one surface and separated by flat portions on the one surface of the sheet, i.e., the outer surface as shown in FIG. 9. The corresponding protrusions or integral ribs produced by forming these grooves extend down from the inner surface of the sheet, as shown in FIG. 9. When the ribs on the inner surface of the scored layer 38 are brought into face-to-face engagement with an associated face of a smooth layer, air spaces are created between the ribs and provide effective insulation. Preferably the grooves or scores are about 5 to 10 mm apart and are about 1–3 mm deep. The scores are formed or embossed into the surface of the sheet by a die, which displaces the sheet material to create the indentations. Preferably the sheet in FIGS. 1A, 5A or 7A is cut and scores 40 are simultaneously, formed by a single blanking operation. Also the sheet is preferably oriented so that the lands face the inside of the container, but the opposite arrangement can also be used.

The ribs formed by scores 40 preferably extend in radial directions transversely across the blank, as illustrated in FIG. 7A, for example, and have a single center of radiation which is substantially coincident with the center of curvature of the arcuate top and bottom edges of the blank, substantially as shown.

Summary, Ramifications, and Scope

Accordingly the reader will see that we have provided several embodiments of thermally insulated cups or containers which will maintain the temperature of their contents much longer than noninsulated cups. When any container is holding a hot or a cold beverage, it will maintain its outer shell at close to ambient temperature, so that it will be comfortable to handle. When it is holding a cold beverage, it will also prevent condensation from forming on its outer shell, so that it will not become slippery. The corrugated, multi-layered construction makes it strong enough to withstand prolonged handling. Its paper (or other suitable sheet material) construction and its minimal use of adhesive makes it environmental friendly. Its design allows it to be made of thinner paper and thereby makes very efficient use of paper stock, so that it consumes a minimal amount Of natural resources. Because its three or two layers are constructed by simply folding and winding a single sheet of paper in a single wrapping operation, it can be easily and inexpensively manufactured with existing machinery. Unlike conventional corrugated boxboard, the layers of its folded blank are not permanently fixedly adhered to one another, so it can easily be wrapped into a cylindrical shape prior to sealing.

Although the above description contains many specificities, they should not be considered as limitations on the scope of the invention, but only as examples of the preferred embodiment. Many other ramifications and variations are possible within the teachings of the invention. For example, instead of paper, other suitable materials, such as biodegradable plastic, if available, other plastic, metal, stiff fiber, etc. can be used. The reflective coating can be eliminated.

The separate elongated pieces shown in FIGS. 1C and 5C, and used as an alternative to FIG. 7A can be crimped instead of glued together. The ends of the middle corrugated portion (FIG. 2B) may be glued or crimped together. The portion used for the smooth outer shell in FIGS. 1 to 6 may be shorter than the portion used for the smooth inner shell so that only the top edge of the inner shell need be rolled outwardly to form the rim, and only the bottom edge of the inner shell need be folded inwardly to seal the bottom. In FIG. 5C, corrugated portion 34' may be glued in a centered and parallel position on smooth section 32, thereby requiring only that left end portion 12 be folded over the corrugated section to make all three sections parallel.

The construction method of forming a multi-layered cup from a continuous sheet can be used for creating types of insulated containers, such as milk cartons, ice cream cartons, orange juice- or biscuit-type (composite) cans, etc.

The corrugated portion can be formed by being die cut as one or more thin, parallel, spaced strips that connect the two smooth end portions. Instead of vertical corrugations or grooves, the middle layer can employ any other type of distortion deformation, embossing, or spacing means to create air pockets or spaces between the inner and outer shells. E.g., the insulating layer can use dimples (round or elongated), horizontal or diagonal ridges or ribs, or any other type of deformed sheet material, including porous sheet material, to make it insulating. Instead of the corrugated layer being on the outside as shown in FIG. 8B, the layers may be reversed so that the corrugated layer is on the inside and the smooth layer is on the outside. The corrugated portion can be rectangular, instead of tapered. In this case it can be wrapped around tapered inner shell 13S by spreading or fanning its corrugations wider at its top, or by making the corrugations deeper at the bottom and shallower at the top to convert it into a tapered shape.

Therefore the reader is requested to determine the scope of the invention by the appended claims and their legal equivalents, and not by the examples given.

We claim:

1. A blank for forming a sidewall of a thermally insulated container, comprising:

a multi-layered sheet arrangement having first and second portions for providing first and second layers of said arrangement, each of said first and second portions being of a predetermined size for forming respective inner and outer layers of said sidewall, and a third portion which has opposite sides for providing a middle layer of said arrangement, said first and second portions being folded over said opposite sides, respectively, of said third portion so as to provide said first and second layers of said arrangement, said third portion thereby being sandwiched between said first and second layers for providing said middle layer of said arrangement, said third portion having integrally formed plural deformities which cooperate with said inner and outer layers when said third portion is sandwiched between said inner and outer layers for providing air space between said inner and outer layers.

2. The blank of claim 1 wherein said first portion, said second portion, and said third portion are all formed of one homogeneous piece of sheet material comprising essentially paper, and said deformities comprise a plurality of ridges.

3. The blank of claim 1 wherein said first portion, said second portion, and said third portion are all formed of one homogeneous sheet of material comprising essentially paper, and said deformities comprise a plurality of corrugations.

4. The blank of claim 1 wherein said third portion is formed from a separate piece of sheet material.

5. The blank of claim 1 further including adhesive disposed between said first and second layers in order to hold said first and second layers together in a substantially flat configuration.

6. A thermally insulated container comprising:

a multi-layered shell which defines an interior volume, said shell having top and bottom portions, with an opening at said top portion; and a bottom closure which is attached to said bottom portion;

said shell being formed from a sheet having first and second portions for providing inner and outer layers of said shell, and a third portion which has opposite sides and which defines a middle layer of said shell;

said first and second portions being folded over said opposite sides, respectively, of said third portion, thereby providing said inner and outer layers of said shell, said third portion thereby being sandwiched between said first and second layers for providing said middle layer of said shell;

said third portion having plural deformities formed therein for cooperating with said inner and outer layers when said third portion is sandwiched between said inner and outer layers for providing air space between said inner and outer layers of said shell.

7. The thermally insulated container of claim 6 wherein said first portion, said second portion, and said third portion are all formed of one homogeneous piece of sheet material.

8. The thermally insulated container of claim 6 wherein said first portion, said second portion, and said third portion are all formed of one homogeneous piece of sheet material, and said deformities comprise a plurality of ribs.

9. The thermally insulated container of claim 6 wherein said first portion, said second portion, and said third portion are all formed of one homogeneous piece of sheet material, and said deformities comprise a plurality of corrugations.

10. The thermally insulated container of claim 6 wherein said third portion is formed from a separate piece of sheet material.

11. The thermally insulated container of claim 6 wherein said shell has a tapered shape which has a larger cross sectional area at said top portion and a smaller cross sectional area at said bottom portion, said shell further including an outwardly rolled rim along said top portion.

12. A thermally insulated container, comprising:

an outer shell which forms an outer layer of said container;

an inner shell concentrically positioned within said outer shell, said inner shell forming an inner layer of said container;

a middle layer which is sandwiched between said outer shell and said inner shell, said middle layer having plural distortions that provide air space between said outer and said inner shells; and a bottom closure attached to a bottom portion of said inner shell;

said outer shell, said middle layer, and said inner shell being all formed of an elongated sheet having first and second portions, and a distorted portion which has opposite sides, said first and second portions being folded over said opposite sides of said distorted portion, respectfully, such that said elongated sheet is folded;

whereby said outer shell, said middle layer, and said inner shell cooperate to define said air space therebetween for providing thermal insulation for any material disposed within said container.

13. The thermally insulated container of claim 12 wherein said elongated sheet is homogeneous and comprises essentially paper.

14. The thermally insulated container of claim 12 wherein said elongated sheet is homogeneous and comprises essentially paper, said distorted portion is positioned at one end of said first and second portions, and said first and second portions are relatively smooth.

15. The thermally insulated container of claim 12 wherein said elongated sheet is homogeneous and comprises essentially paper, said distorted portion is positioned between said first and second portions, and said first and second portions are relatively smooth.

16. The thermally insulated container of claim 12 wherein said first and second portions are each arcuate shaped so as to form tapered inner and outer shells.

17. The thermally insulated container of claim 12 wherein said inner and outer shells are substantially cylindrical, said elongated sheet is homogenous, and said distortions comprise a plurality of ridges.

18. A method of making a thermally insulated container, comprising the steps of:

providing a bottom closure;

providing a sheet having first and second portions of a predetermined size for forming respective inner and outer layers of said container, and a third portion which has opposite sides and plural deformities integrally formed therein for cooperating with said inner and outer layers to provide plural air spaces therebetween;

folding said first and second portions on opposite sides, respectfully, of said third portion to provide a multi-layered arrangement, said third portion thereby being sandwiched between said first and second portions, said arrangement having opposite end portions;

joining said opposite end portions of said arrangement to form a shell which defines an interior volume and which has top and bottom portions; and sealing said bottom closure to said bottom portion.

19. The method of claim 18 wherein said sheet is one homogeneous piece comprising essentially paper.

20. The method of claim 18 wherein said sheet is one homogeneous piece comprising essentially paper and said deformities are selected from the group consisting of corrugations, ridges, grooves, and dimples.

21. The method of claim 18 wherein said first and second portions are relatively smooth and arcuate shaped so as to form a tapered shell.

22. The method of claim 18 wherein said third portion is a separate sheet of material.

23. The method of claim 18 wherein said step of folding said first and second portions into a position on opposite sides, respectfully, of said third portion further includes the step of applying a small amount adhesive between said first and second portions of a sufficient quantity to hold said first and second portions on said opposite sides, respectively, of said third portion.

24. A thermally insulated container sidewall blank, comprising:

an elongated strip of sheet material having inner and outer surfaces and transversely spaced apart top and bottom edges;

said blank defining contiguous first and second sections joined together in end-to-end relation to each other along a common fold line extending transversely across said blank;

said second section having a multiplicity of indentations formed in said outer surface thereof and a multiplicity of protrusions equal in number to said indentations formed by said inner surface thereof;

said protrusions cooperating with said inner surface of said first section to form air spaces within said container blank between said first and second sections when first and second sections are folded about said common fold line relative to each other to bring said projections on the inner surface of said second section into face-to-face engagement with the inner surface of said first section.

25. A thermally insulated container sidewall blank as set forth in claim 24 wherein said first section has a transverse dimension greater than the transverse dimension of said second section.

26. A thermally insulated container sidewall blank as set forth in claim 24 wherein said top and bottom edges of said first section have arcuate edges.

27. A thermally insulated container sidewall blank as set forth in claim 26 wherein said top and bottom edges of said second section have arcuate edges.

28. A thermally insulated container sidewall blank as set forth in claim 27 wherein said arcuate top and bottom edges have a common center of curvature.

29. A thermally insulated container sidewall blank as set forth in claim 28 wherein said protrusions comprise ribs.

30. A thermally insulated container sidewall blank as set forth in claim 29 wherein said ribs extend radially across said second section and have a single center of radiation.

31. A thermally insulated container sidewall blank as set forth in claim 30 wherein said single center of radiation is coincident with said common center.

32. A thermally insulated container sidewall blank as set forth in claim 24 wherein said top edge of said second section is spaced downwardly from the top edge of said first section and said bottom edge of said second section is spaced upwardly from said bottom edge of said first section.

33. A method for making a thermally insulated container comprising the steps of:

cutting from sheet material having inner and outer surfaces an elongated container sidewall blank having top and bottom edges and defining first and second continuous sections;

forming on said second section a multiplicity of indentations in said outer surface thereof and a multiplicity of protrusions equal in number to said indentations on said inner surface thereof;

folding said first and second portions about a common fold line to bring the protrusions on the inner surface of second section into face-to-face engagement with the inner surface of said first section to form a multilayered container-blank having one end portion defined by said common fold line and another end portion opposite said one end portion;

bringing said other end portion into overlapping engagement with said one end portion;

joining said other end portion to said one end portion to form a continuous sidewall blank;

attaching a container bottom closure; and sealing a bottom portion of said sidewall blank to said bottom closure.

34. A method for making a thermally insulated container as set forth in claim 33 wherein said step of forming comprises scoring said outer surface.

35. A method for making a thermally insulated container as set forth in claim 33 wherein said step of forming comprises embossing.

36. A method for making a thermally insulated container as set forth in claim 33 wherein said step of forming comprises corrugating.

37. A method for making a thermally insulated container as set forth in claim 33 wherein the steps of cutting and forming are simultaneously performed.

38. A thermally insulated container, comprising:

an outer shell which forms an outer layer of said container;

a substantially smooth inner shell concentrically positioned within said outer shell, said inner shell forming an inner layer of said container;

said outer shell having distortions that create plural air spaces between said outer shell and said inner shell; and a bottom closure attached to a bottom portion of said inner shell;

said outer shell and said inner shell being both formed of one elongated sheet;

said one elongated sheet having a substantially smooth portion which provides said inner shell of said container, and a distorted portion which has opposite sides and which provides said outer shell of said container;

said smooth portion being folded adjacent said distorted portion such that said one elongated sheet is folded;

whereby said outer shell and said inner shell cooperate to define said plural air spaces for providing thermal insulation for any material disposed within said container, yet said container is easy and economical to fabricate.

39. The thermally insulated container of claim 38, further including a waterproof coating disposed on said inner shell and said bottom closure.

40. The thermally insulated container of claim 39 wherein said waterproof coating is a material selected from the group consisting of wax and plastic.

41. The thermally insulated container of claim 38 wherein, in said outer shell, said distortions comprise a plurality of spaced grooves.

42. The thermally insulated container of claim 38, further including a reflective coating disposed on one of said layers for reflecting heat back towards its source.

43. The thermally insulated container of claim 38 wherein said smooth portion and said distorted portion are formed from two separate pieces which are attached together to form said elongated sheet.

44. The thermally insulated container of claim 38 wherein said elongated sheet is homogeneous.

45. A method of making a thermally insulated container, comprising:

providing an elongated sheet having a first portion which is substantially smooth and a second portion which is distorted, said second portion having spacing means that provide plural air spaces between said smooth portion and said distorted portion when said portions are positioned face to face with each other;

folding said first and second portions together to provide a two-layered folded arrangement;

wrapping said two-layered arrangement into a cylindrical shape;

joining opposite ends of said two-layered arrangement to form a stable cylinder in which said smooth portion forms a cylindrical inner shell and said distorted portion forms a cylindrical outer shell surrounding said inner shell; and sealing a bottom portion of said cylinder with a bottom closure;

whereby said outer shell and said inner shell cooperate to define said plural air spaces for providing thermal insulation for any material disposed within said container, yet said container is easy and economical to fabricate.

46. The method of claim 45 wherein said second portion comprises a plurality of spaced grooves.

47. The method of claim 45 wherein said first and second portions are arc-shaped so as to form a tapered cylindrical shell when said two-layered arrangement is wrapped into a cylinder.

48. The thermally insulated container of claim 45 wherein said smooth portion and said distorted portion are formed from separate pieces which are attached together to form said elongated sheet.

49. A thermally insulated container having an upper end, said upper end having an opening, said container comprising a bottom wall and a continuous sidewall joined to said bottom wall, said sidewall being formed of a single elongated strip of sheet material defining contiguous first and second layers joined together along a common fold line and disposed in face-to-face engagement to each other, one of said layers having integral means defining depressions in a face thereof for cooperating with an associated face of the other of said layers to form a plurality of air spaces between said one layer and said other layer, said continuous sidewall having a side seam partially defined by a marginal portion of one of said layers adjacent said fold line.

50. A thermally insulated container as set forth in claim 49 wherein said one layer defines a portion of an exterior surface of said container.

51. A thermally insulated container as set forth in claim 49 wherein said integral means comprises scoring formed in said one layer.

52. A thermally insulated container as set forth in claim 49 wherein said integral means comprises a plurality of corrugations.

53. A thermally insulated container sidewall, comprising:

a shell formed from an elongated piece of sheet material having a fold line which divides said elongated piece of sheet material into contiguous first and second sections;

said first and second sections being folded about said fold line so that said first and second sections are in face-to-face engagement with each other so as to form said respective first and second layers of said shell;

said second layer having a multiplicity of deformities to provide air space between said first and second layers of said shell.

54. A method of making a thermally insulated container sidewall, comprising the steps of:

providing an elongated piece of sheet material having a fold line which divides said elongated piece of sheet material into contiguous first and second sections;

forming a multiplicity of deformities on said second section;

folding said first and second sections about said fold line to bring said second section into face-to-face engagement with said first section to form a multi-layered sheet arrangement having a first end portion defined by said fold line and a second end portion opposite said first end portion;

bringing said first and second end portions adjacent each other;

attaching said first and second end portions to form a sidewall shell.

* * * * *

UNITED STATES PATENT AND TRADEMARK OFFICE
CERTIFICATE OF CORRECTION

PATENT NO. : 5,660,326
DATED : AUG 26., 1997
INVENTOR(S) : R. VARANO AND C. E. SADLIER

It is certified that error appears in the above-indentified patent and that said Letters Patent is hereby corrected as shown below:

Title page, col. 1, Item [73], change "Insul-Air Holding, Inc." to
— Insul-Air Holdings, Inc.—.

col. 2, In Abstract par., l. 10, change "finishell" to —finished—.
Col. 3, lines 8 and 10, change "finishell" to —finished—.
Col. 4, line 37, change "fast" to —first—.
Col. 5, l. 45, change "distinguishell" to —distinguished—.

Col. 6, l. 9, change "finishell" to —finished—.

Signed and Sealed this

Twenty-fifth Day of November, 1997

Attest:

BRUCE LEHMAN

Attesting Officer    Commissioner of Patents and Trademarks